United States Patent

Wittur et al.

[19]

[11] Patent Number: 6,102,165
[45] Date of Patent: Aug. 15, 2000

[54] ANTIFRICTION BEARING WITH SIGNAL GENERATOR AND METHOD FOR USING SAME

[75] Inventors: Horst Wittur, Karlsfeld; Hubert Fischer, Munich, both of Germany

[73] Assignee: Wittur AG, Germany

[21] Appl. No.: 08/955,215

[22] Filed: Oct. 21, 1997

Related U.S. Application Data

[63] Continuation of application No. PCT/EP96/01648, Apr. 19, 1996, abandoned.

[30] Foreign Application Priority Data

Apr. 21, 1995 [DE] Germany .......................... 195 14 801

[51] Int. Cl.[7] ........................................ B66B 3/00
[52] U.S. Cl. ............................................. 187/393
[58] Field of Search ................... 187/247, 391, 187/393; 318/652, 661, 647; 73/494, 504.07, 514.19, 514.26, 514.34

[56] References Cited

U.S. PATENT DOCUMENTS

| | | | |
|---|---|---|---|
| 3,835,326 | 9/1974 | Gerve et al. ............................ | 250/393 |
| 4,196,629 | 4/1980 | Philips ...................................... | 73/593 |
| 4,448,077 | 5/1984 | Sato et al. ................................. | 73/660 |
| 4,800,512 | 1/1989 | Busch ................................. | 364/551.01 |
| 5,223,679 | 6/1993 | Yoo ........................................ | 187/134 |
| 5,287,738 | 2/1994 | Polinsky et al. ....................... | 73/118.1 |
| 5,627,421 | 5/1997 | Miller et al. ........................... | 310/90.5 |

FOREIGN PATENT DOCUMENTS

| | | |
|---|---|---|
| 0631140 | 6/1964 | European Pat. Off. . |
| 0405999 | 6/1990 | European Pat. Off. . |
| 0706968 | 7/1995 | European Pat. Off. . |

*Primary Examiner*—Jonathan Salata
*Attorney, Agent, or Firm*—Thomas R. Vigil

[57] ABSTRACT

For controlling and surveying the operation of elevator systems pulse generators are used which are integrated into antifriction bearings of mutually pivotable structural members of the elevator system. By measuring pulse numbers and pulse frequency, conditions of movement and positions of moving parts, like e.g. the elevator cage (5) and the doors (13), can be detected and evaluated in a computer.

20 Claims, 2 Drawing Sheets

ANTIFRICTION BEARING WITH SIGNAL GENERATOR AND METHOD FOR USING SAME

CROSS REFERENCE TO RELATED APPLICATIONS

This is a continuing application of PCT/EP/96/01648 filed Apr. 19, 1996, now abandoned.

BACKGROUND OF THE INVENTION

1. Field of the Invention

The invention relates to a method for controlling and surveying the operation of an elevator system. In addition, an antifriction bearing for use in the method is also the subject matter of the present invention.

2. Description of the Prior Art

The control of an elevator system must meet two demands. On one hand, a control of the operation must occur in correspondence with the signals inputted by the users, wherein also special motion programs can be made use of, on the other hand safety of operation must be surveyed continually, this primarily including surveillance of closing condition of the doors, surveillance of speed of movement and protection against overload.

Such a control and surveillance presupposes the detection and processing of certain input values which have to be continually detected during operation. This usually is done using controls and checking circuitry permitting detection of operating data depending on time and path and evaluation thereof. Therein it is the essential point that the elevator cage is detected in its position and/or movement, respectively, in the elevator shaft as exactly as possible and to bring it to a standstill in a given position.

Detection of the position and/or movement condition, respectively, generally is effected by mechanical arrangements, like tracer systems or belts, ropes or the like directly connected to the elevator cage, by which a direct checking function can be executed. Due to the mechanical construction, however, the possibility of using such systems in case of high moving speeds and large lift heights is limited.

In addition, also meters of different construction are known, which generate pulses or analogue voltages from a rotational movement using frictional engagement, belt drive, chain drive or other kinds of transmission, which values serve as input values for the control. Mostly, it Is a matter of add-on devices with attachments which mostly are subject to a certain amount of slippage and thus e.g. do not permit direct final switch-off in a holding position. Thereby, further switch-off and/or changing circuitry or doubling of the comparatively expensive systems become necessary.

SUMMARY OF THE INVENTION

It is, therefore, the main object of the present invention to provide a method for controlling and surveying an elevator system and an antifriction bearing for effecting the method which enable improved control and surveillance of the elevator system.

In order to achieve this object, it is a feature of the invention to detect signals indicating the operation condition of an elevator system by pulse generators in antifriction bearing and by alternative means for signal detection integrated in the antifriction bearings, e.g. reacting to noise frequencies of the bearing or pressure waves. This has the advantage that the accuracy of the detection of failures in the elevator system is improved.

The antifriction bearing for effecting the method the invention is characterized in that the bearing includes a sensor or a pulse generator for signal detection as well as alternative means for signal detecting, such as sensors reacting to noise frequencies.

The invention is based on the fact that in an elevator system there exists a plurality of rotational drives for actuating the different groups of components, in particular the elevator cage as well as the elevator and shaft doors. The rotational parts of such rotational drives, e.g. the shaft of the drive motor or a part of a transmission, therein as a rule are supported in antifriction bearings. The rotational displacement condition of a rotational part, either statically or dynamically, thus represents a value which corresponds to the static or dynamic condition of the driven part.

For example, driving of the elevator cage mostly is effected by a pulley over which the track ropes are running. If the number of revolutions of the pulley is counted each single counted value corresponds to a certain position of the elevator cage in the shaft. If, however, the speed of rotation of the pulley is measured, this is a value representing the moving speed of the elevator cage.

Antifriction bearings with integrated pulse generators are known, e.g. from EP 0 631 140 A1. Therein, an encoder in form of a ring made from magnetic material is mounted on the circumferential ring of the bearing, onto which north and south poles are magnetized which generate a sinusoidal magnetic field. A sensor provided with an electrical terminal, in which pulses are generated upon rotation of the magnet ring is located in one position of the stationary bearing ring. The number of pulses generated per revolution corresponds to the number of poles located on the magnet ring. By counting the pulses in a suitable evaluation circuitry, the number of revolutions and the respective angular position of the rotating part can be calculated. The pulse frequency during rotation is a measure for the speed of rotation.

The use of such bearings opens a great variety of possibilities for control and surveillance of an elevator system. Thus, the speed of movement of the elevator cage can be detected by a pulse generator in a bearing of the main engine, the pulley or a deflection sheave. In addition, the speed can also be directly measured on the elevator cage by measuring the speed of rotation of one or several guide rolls in the above described manner. Finally, also the bearing at the deflection sheave is suitable for detecting the speed of the elevator, for a speed limiting rope which for safety reasons is present additionally and independently from the track ropes.

In the same manner in which the speed of the elevator cage was detected, it also is possible to detect its position in the shaft by counting and converting by calculation the number of pulses from at least one of the above bearings. As the number of pulses can be very high depending on the bearing questioned and thus one single pulse is the measure for a very short interval of the path of the elevator cage, an extremely sensible path control can be effected. Moreover, rope slippage and rope lengthening can be balanced by separate detection of elevator cage path, e.g. by guide rolls and the pulley, and by comparing the measured values.

Furthermore, the cabin and shaft doors can be controlled and surveyed in the manner in accordance with the present invention. The drive of the doors mostly is effected using cable control with respective rotational drives, into which at least one antifrictional bearing with a pulse generator can be incorporated. From the counted number of pulses, the opening condition of the respective door can be detected and included into the operation and safety control.

Since the bearings with integrated pulse generators have the dimensions of common standardized bearings, also retrofitting of existing elevator systems to the control and surveillance method in accordance with the present invention is possible without extensive labor.

DESCRIPTION OF THE PREFERRED EMBODIMENTS

Figure 1:
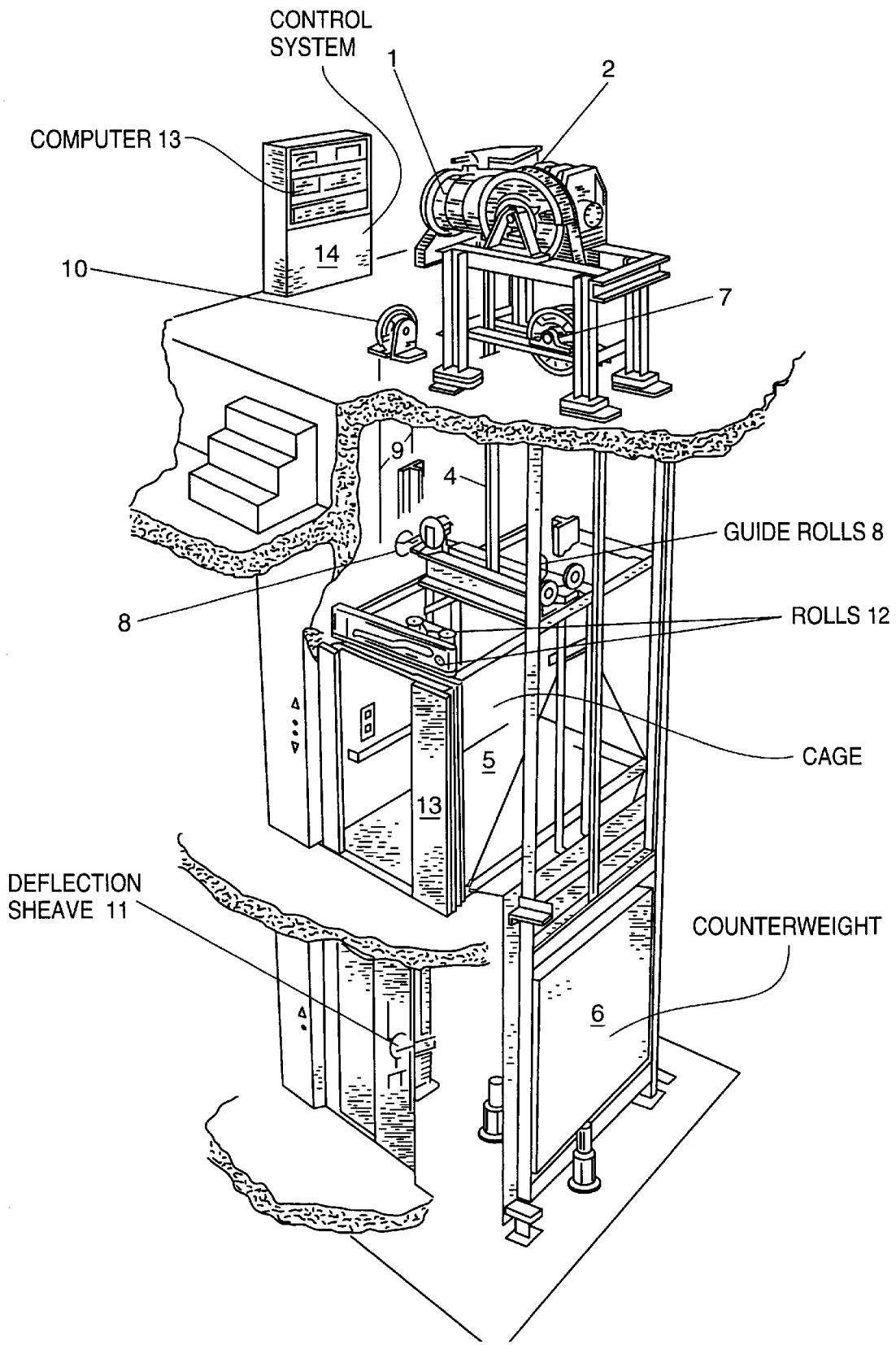
FIG. 1 shows an elevator system in a schematical principle view.

The elevator system comprises a main drive engine 1 located above the uppermost floor, with a pulley 2 coupled thereto by means of a transmission. The parallelly extending ropes put thereover on one hand carry the elevator cage 5 and on the other hand the counterweight 6, the rope side carrying the counterweight being guided over a deflection sheave 7. The elevator cage 5 is provided with guide rolls 8 on two sides as well as on top and bottom, which run on the shaft guides under spring pressure.

The elevator system further includes a safety apparatus for limitation of speed. For being capable of being efficient even in the unprobable event of breaking of all ropes or the rope fixation, the safety apparatus is independent from drive, suspension and guide of the elevator cage. In the shown embodiment it consists of a rope 9 which with both ends is fixed to the elevator cage and guided around an upper deflection sheave 10 and a lower deflection sheave 11 for forming a loop. The rope 9 forms a safety rope or speed limitation rope. In addition to the prescribed function of communicating excess speed to the safety circuit, in known systems the running speed is detected by means of additionally inserted devices, like speedometers and pulse generators.

The elevator cage 5 has a mechanically actuable cabin door whose drive is arranged on the elevator cage roof and a.o. includes rolls 12 for moving the door as well as for actuating a lock. In each floor a shaft door 13 whose drive is of similar construction and which has not been shown in the drawing for better outlay, exists opposite to the cabin door.

The control and surveillance of all courses takes place in a central control system 14 connected to the drive, the elevator cage and the service fields at the shaft doors by means of current, control and signal lines (not shown).

As can be seen from the above description, the to that extent conventional elevator system comprises a plurality of rotating components, like the shafts of electromotors, pulleys and rope rolls, rollers and the like. These rotating components as a rule are supported in antifrictional bearings, roller bearings in particular, wherein either the inner bearing ring is stationary and the outer one is rotating or vice versa. These bearings can be made use of for control and/or surveillance of the elevator system in manifold manner by incorporation of a pulse generator.

Thus, the bearing of the shaft of the main drive motor 1 and/or the bearing of the pulley 2 and/or the bearing of the deflecting sheave 7 is suited for detection of pulse frequency and calculatory conversion thereof into speed of movement by means of a computer 13 existing in the control system 14. Detection and processing of the pulses therein is effected in dependence on direction.

Furthermore, detection of pulse frequency can be effected at one or both deflection sheaves 10 and 11 for the rope 9 of the speed limitation. A comparison of the detected values with one another and with the speed values received from the drive system reveals occurrence of rope slippage directly and quantitatively so that the required control measurements can be initiated automatically.

Similar to the speed of the elevator cage 5, also the position thereof in the shaft can be detected using pulse generators in certain antifriction bearings. For doing so, it is necessary the detect the number of pulses instead of the frequency or in addition thereto and to add them in an adding device in dependence on direction. For detection of pulse number in principle the same bearings can be used as for detection of speed of motion by measuring the pulse frequency. Here, too, a comparison of the values obtained from the main drive system with those of the apparatus for speed limitation is possible for balancing rope slippage and rope lengthening.

Motion path measurement can be carried out by selection of suitable bearings with pulse generators and by a correspondingly drafted computer program so accurately that thereby also the stop positions can be determined and approached without mechanical contact generators in the shaft being required.

A further possibility for speed and path measurement is offered by the bearings of guide rolls 8 by means of which the elevator cage 5 is guided on the guide rails in the shaft. The number of revolutions and the speed of these guide rolls is in direct relation to the path covered by the elevator cage 5 so that pulse values derived from the pulse generators 21 (FIG.2) in these bearings can be processed into path and speed values. Possibly occurring inaccuracies can be corrected in that the measuring values of at least two guide rolls are detected and differences are eliminated.

Pulse generators in the guide rolls 8 also are well suitable for detecting values for comparison with measured values from the main drive system and the safety apparatus.

Also the control and surveillance of the elevator doors can be carried out using pulse generators in bearings suited for this purpose. Here the bearings of rolls 12 are particularly suitable which are intended for driving the doors for opening and closing as well as actuation of locking members. By processing of the measured values therein the operation of the cabin door can be harmonized to that of the shaft doors 13.

It is generally known that most malfunctions in an elevator system are located in the area of the doors. The method in accordance with the present invention permits to recognize an approaching malfunction in time. Thus it can e.g. be detected from a comparison of all door actions whether a pulley repeatedly has different pulse sequences. Therefrom it can then be concluded that either the bearing itself or the rope tension is defective. By communicating such malfunction in time, an inspection or repair can be carried out before standstill of the entire system will be required.

The method in accordance with the present invention needs not be restricted to one single elevator system but can also detect several elevators operated one beside the other or in different places. Thus it also is possible e.g. in larger building complexes to survey a plurality of elevators centrally.

The antifriction bearings with integrated pulse generators with their installation requirements correspond to common bearings. In known antifriction bearings with stationary outer ring the installation measures correspond to common bearing dimensions. Only room must be available for installation of the signal line leaving the sensor. In a total system as just described also bearings with reverse function are used, i.e. bearings with stationary inner ring and rotating outer ring.

Figure 2:
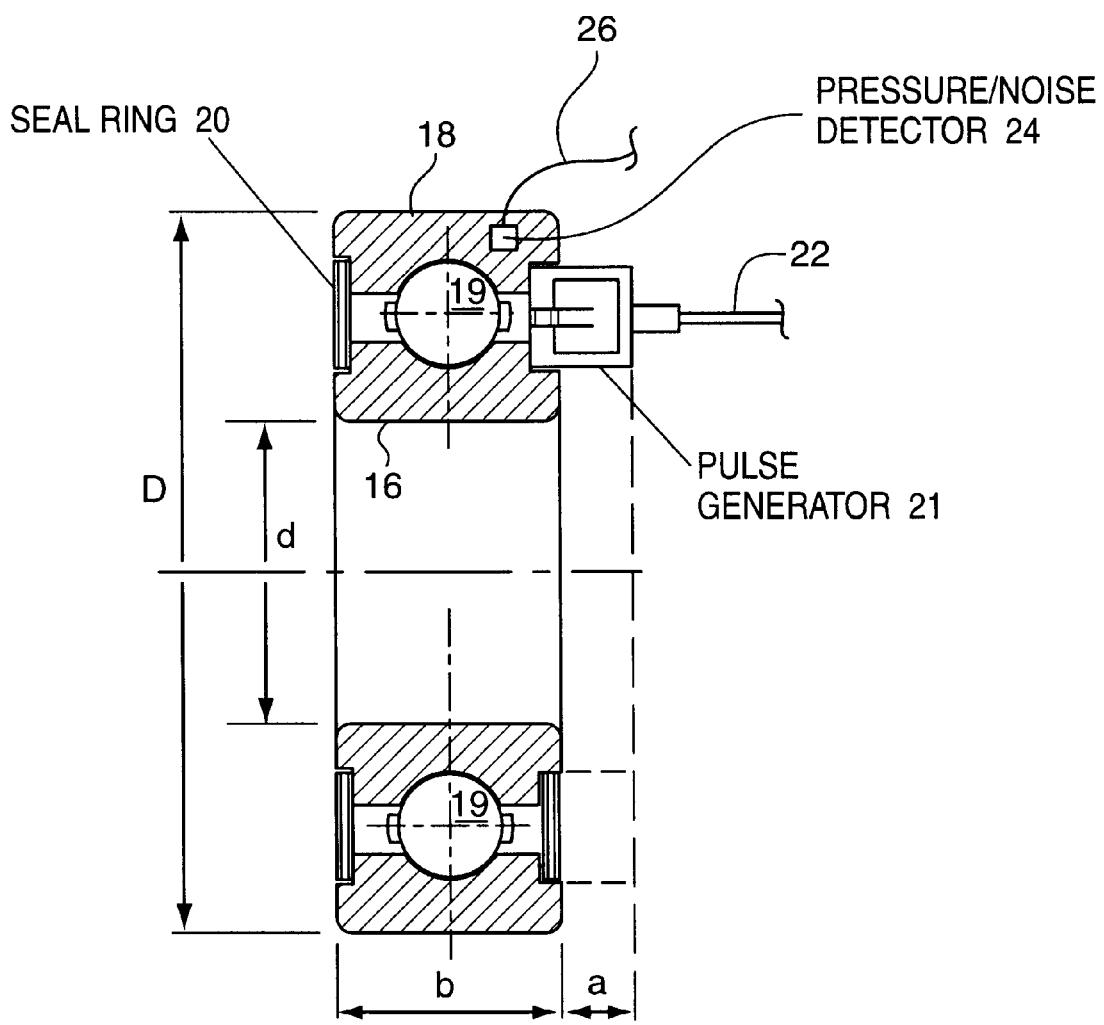
FIG. 2 shows an antifriction bearing usable in the method in accordance with the present invention.

Such a bearing is shown in FIG. 2. The inner ring 16 in this case is stationary while the outer ring 18 can be turned by bearing balls 19 and e.g. carries a guide roll 8. On the left-hand side in FIG. 2 the bearing is sealed with a sealing ring 20. With these components and the dimensions D for the outer diameter, d for the inner diameter and b for the axial length the bearing is identical to those of conventional construction.

On the left-hand side in FIG. 2 the standard sealing ring is substituted for by a special sealing ring 21 which is fixed to the inner ring and into which the sensor for signal detection is integrated. The sensor receives the induction pulses of the magnet ring circulating together with the outer bearing ring 18. The pulses are transmitted to the control system 14 by signal line 22. The bearing thus is enlarged by the dimension a only as compared to the dimensions of conventional bearings. This area in the longitudinal extension of the bearing usually is not located in the area for fixation of the bearing within a construction and thus can be utilized for signal detection and for the electric connection.

In case of the embodiment with rotating inner ring the magnet ring is fixed on the inner ring 16 and circulates together therewith, while the sealing ring 21 with the sensor is fixed to the outer ring 18.

The method in accordance with the present invention, when combined with a bearing embodied therefor, also permits to use alternative signal detection, like pressure waves and noise frequencies of a bearing with a pressure or noise detector 24 (FIG.2) and to convert those into logically utilizable pulses supplied via a line 26, which can be an optical line, connected to the control system 14. The invention in addition also permits a direct scanning of the orbiting balls, ball cages or roller cages with a micro laser beam through a glass fiber line.

What is claimed is:

1. A method for controlling and surveying, with a control and surveillance system, the operation of an elevator system including an elevator cage, wherein the states of movement and/or rotational displacement of one of a drive engine, deflection sheaves, pulleys or guide rolls of the elevator system for the elevator cage are detected with the aid of pulse generators which are incorporated into an antifriction bearing in at least one of a drive engine, a deflection sheave, a pulley, or a guide roll of the elevator system and that the detected pulse values, with the aid of a computer of the control and surveillance system are converted into data used for control of the main drive system and at least one additional sensor and associated signal generating means are incorporated into said antifriction bearings for sensing the value of at least one bearing operating parameter and for generating and transmitting to said control and surveillance system, a signal indicative of the value sensed, for surveillance of the elevator drive system.

2. A method as defined in claim 1, wherein the speed of movement of the elevator cage (5) is detected by detecting pulses from a pulse generator incorporated into a bearing of the drive motor (1).

3. A method as defined in claim 1, wherein the speed of movement of the elevator cage (5) is detected by detecting pulses from a pulse generator incorporated into a bearing of the pulley (2).

4. A method as defined in claim 1, wherein the speed of movement of the elevator cage (5) is detected by detecting pulses from a pulse generator incorporated into a bearing of the deflection sheave (7).

5. A method as defined in claim 1, wherein the speed of movement of the elevator cage (5) is detected by detecting pulses from a pulse generator incorporated into a bearing of the guide roll (8).

6. A method as defined in claim 1, wherein the speed of movement of the elevator cage (5) is detected by detecting pulses from at least two pulse generators incorporated into the bearings of different guide rolls (8) and wherein the values of the detected pulses are compared with one another and are averaged.

7. A method as defined in claim 1, wherein the speed of movement of the elevator cage (5) is detected by detecting pulses from a pulse generator incorporated into a bearing of the deflection sheave (10, 11) for a speed limitation rope (9).

8. A method as defined in claim 1, wherein the position of the elevator cage (5) is found by detecting pulses from at least one of the pulse generators in one of the antifriction bearings mounting a deflection sheave and determining the detected pulse number and dividing the pulse number into the total number of pulses for the path of travel of the elevator cage, thereby to determine the position of the elevator cage.

9. A method as defined in claim 1, wherein the distance passed by the elevator cage (5) is detected by determining the pulse values of at least one pulse generator incorporated into the bearing of a guide roll (8).

10. A method as defined in claim 8, wherein the distance passed by the elevator cage (5) for a certain motion cycle is detected in opposite directions and the detected values are compared to one another for correction of incorrect measurements.

11. A method as defined in claim 8, wherein slippage of a rope is detected by comparing the detected pulses from a pulse generator in an antifriction bearing mounted in a deflection sheave associated with a rope loop with the detected pulses from a pulse generator in an antifriction bearing associated with one of the components of the elevator system for driving the elevator cage.

12. A method as defined in claim 8, wherein the position of a cabin door of the elevator cage is determined by detecting pulses from at least one pulse generator incorporated into a bearing in a component of a system for opening and closing the cabin door.

13. A method as defined in claim 1, wherein the position of a shaft door is detected by detecting pulses from at least one pulse generator incorporated into a bearing in the drive for the shaft door (13) and is included in said control and surveillance system for the elevator system.

14. A method as defined in claim 1, wherein the condition of a door locking mechanism is detected by detecting pulses from at least one pulse generator incorporated into a bearing in the drive for the door locking mechanism and is included in said control and surveillance system for the elevator system.

15. An antifriction bearing for effecting the method as defined in claim 1, wherein a sensor, to which a magnet ring fixed to a circulating bearing ring is opposed, is incorporated into one of the sealing rings (21) axially covering a bearing gap and the antifriction bearing.

16. An antifriction bearing as defined in claim 15, wherein the inner ring (16) of the bearing is stationary and the outer ring (18) is made circulating.

17. An antifriction bearing as defined in claim 15, wherein said antifriction bearing is built as a ball bearing.

18. An antifriction bearing according to claim 15, wherein said additional sensor for detecting signals is responsive to pressure waves.

19. An antifriction bearing according to claim 15, wherein said additional sensor for detecting signals is responsive to noise frequencies of the bearing.

20. An antifriction bearing as defined in claim 15, wherein said additional sensor for signal detection include a glass fiber line.

\* \* \* \* \*